May 14, 1968   M. J. McCULLOUGH   3,382,895
SEQUENTIALLY OPERATED PLURAL VALVES FOR GAS DUCT
Filed Dec. 10, 1966

INVENTOR.
MARSHALL J. McCULLOUGH
By Donald G. Dalton
Attorney 3,382,895
Patented May 14, 1968

3,382,895
SEQUENTIALLY OPERATED PLURAL VALVES FOR GAS DUCT
Marshall J. McCullough, Chicago, Ill., assignor to United States Steel Corporation, a corporation of Delaware
Filed Dec. 10, 1965, Ser. No. 512,999
4 Claims. (Cl. 137—630.15)

The present invention relates to a valve especially suitable for use in vacuum lines. More particularly, the invention concerns a valve so constructed as to permit installation in either a horizontal or vertical position. Still more particularly, the invention relates to a vacuum valve such as those associated with vacuum metal-casting equipment.

Valves presently in use in vacuum metal-casting have two major drawbacks. Excessive dirt and dust present in the gases being drawn from the chambers may bind the drive mechanism and thus prevent the valve from operating as necessary. Moreover, full closure of the valve may also be prevented by the particles of dirt or dust and the valve may thus fail to provide a vacuum tight seal. The second drawback caused by the excessive dirt and dust is the necessity for frequent removal of the valves and component parts for cleaning to minimize the trouble caused by the dirt in the system.

Because of unique requirements, valves often have to be designed individually. Moreover, many valves can only be used in the vertical position because they include valve plates suspended by cables or other structures requiring gravity forces to be operative.

The present invention overcomes the above disadvantages and provides for operation in both horizontal and vertical positions. According to the invention, there is provided a valve adaptable for use in vacuum lines which comprises a housing and a valve plate seat fixedly disposed within the housing. The valve plate seat may for example, be fastened or secured to a flange projecting from the housing around the interior thereof. The valve plate seat surrounds the passageway through the interior of the housing. A valve plate is also provided which is pivotally secured at one end to the housing and is adapted to engage the valve plate seat in a gas-tight relationship when the valve is closed. At least one pilot valve is provided in the valve plate and the pilot valve comprises a pivotally mounted pilot valve plate and a corresponding pilot valve plate seat which surrounds an aperture in the valve plate. The pilot valve plate has a cam surface connected thereto which is adapted to extend through the aperture in the valve plate when the pilot valve is closed and the pilot valve plate is in gas-tight relationship with the pilot valve plate seat. There is also provided means to urge the cam through the aperture to disengage the pilot valve plate from the pilot valve plate seat and thereby open the pilot valve. The latter means also serves to open the valve plate and urge it away from the valve plate seat.

The invention will be more fully understood by reference to the appended drawings in which.

Figure 1:
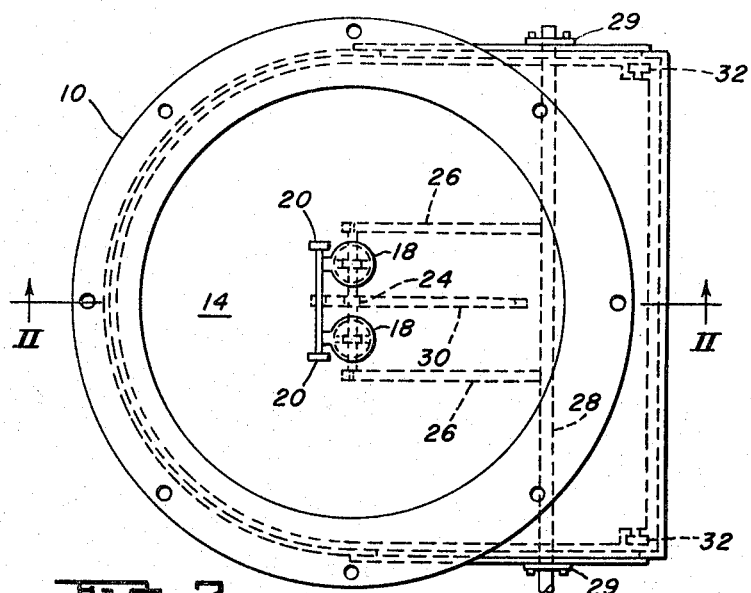
FIGURE 1 is a plan view of the valve of the present invention.

As can be seen in the drawings, a vertical shaped flat bottom housing 10 is adapted to be employed in a vacuum line and serves to contain the valve assembly. The housing 10 has at one end of an annular support 12 for the O ring valve seat 13 which is of circular cross section in the embodiment shown, for valve plate 14. The valve plate 14 is provided with a plurality of pilot valve openings 16 that are sealed by pilot valve plates 18 hinged at 20 for movement between open and closed positions and which seat on small O ring seats 19 provided for that purpose. The pilot valves are provided to partially equalize the pressure prior to fully opening the valve. Each plate 18 has a cam 22 that extends through an opening 16 when the plate is in the closed position. When the valve is closed, the cams 22 contact a roller 24 journaled between parallel rods 26 connected to a shaft 28 which is in turn journaled in the housing 10. The shaft 28 is provided with suitable seals 29 to provide a hermetic seal at the sections of the housing 10 through which the shaft extends. A guide 30 is connected to the bottom of valve plate 14 and the roller 24 is positioned between the guide 30 and the bottom surface of the valve plate.

Figure 2:
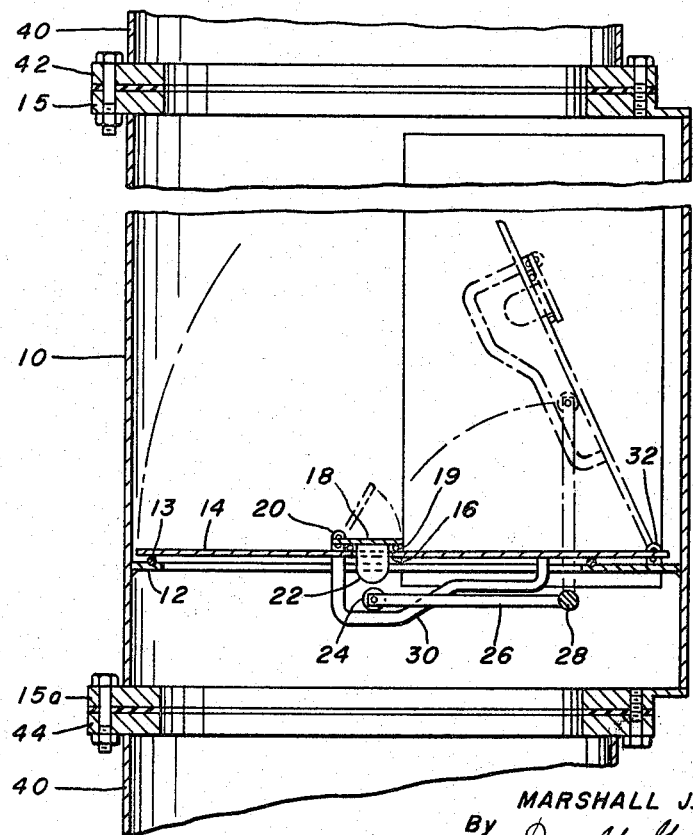
FIGURE 2 is a sectional view of the valve taken along lines II—II of FIGURE 1.

In FIGURE 2, the valve is shown in the closed position; the dotted line form shows the valve as it appears in the open position. The valve plate 14 may be raised to open the valve in the following manner.

The shaft 28 is rotated (clockwise in this embodiment) to cause the roller 24 journaled between the ends of parallel rods 26 to move the pilot valve plate 18 to the opened position, thereby uncovering the openings 16 by contact of the roller 24 against the cams 22 connected to the plates 18. The uncovering of openings 16 partially equalizes the pressure against the valve plate and permits valve plate 14 to be opened by the continued rotation of the shaft 28 which causes roller 24 to contact the valve plate 14 and rotates it clockwise about hinges 32 into the opened position shown in dotted outline in FIGURE 2. The valve plate 14 is closed by rotating the shaft 28 in the opposite direction (counterclockwise) to bring the roller 24 into contact with the guide 30 and cause the valve plate to pivot into the closed position shown in FIGURE 2.

The preferred embodiment of the invention shown in FIGURE 2 illustrates how the vacuum valve may be be adapted for use in a vacuum line. In the example shown, the vacuum valve housing 10 is inserted in a vacuum line duct 40 and is fastened thereto by connection of flanges 15 and 15a to connecting flanges 42 and 44 of the vacuum line duct 40. This arrangement is a simple manner of incorporating the vacuum valve into an existing vacuum line. All that is required is that a section of vacuum line duct 40 is removed and the housing 10 of the vacuum valve is provided with connecting flanges at both ends thereof which are used to mount the valve within the line. As shown, connecting flanges 15 and 15a are bolted to flanges 42 and 44 of the vacuum line duct.

The valve plate 14 can be constructed of any suitable material such as steel. It is only necessary that the plate conform to the interior configuration of the valve. The O ring valve seat can similarly be constructed of any suitable material and can be welded to the valve seat supporting flange 12 or simply positioned in a recess provided for it in the flange surface. Desirably, the valve seat 13 is constructed of a hard material which will not deform readily in use.

It is also apparent that various configurations and enclosures may be accommodated with the valve assembly of the type described herein. In addition, although the valve is particularly useful in vacuum lines as described, it is apparent that the valve may be used in any gas line.

I claim:

1. A valve, adaptable for use in a vacuum line, comprising a housing, a valve plate seat fixedly disposed within said housing and surrounding a passageway therethrough, a valve plate pivotally secured at one end thereof and adapted to engage said valve plate seat in gastight relationship, at least one pilot valve positioned within said valve plate, said pilot valve comprising a pivotally mounted pilot valve plate and a corresponding pilot valve plate seat surrounding an aperture in said valve plate, said pilot valve plate having a cam surface connected thereto and adapted to extend through said aperture when said pilot valve is closed and said pilot valve plate is in gas-tight relationship with said pilot valve plate seat, means to urge said cam through said aperture thereby disengaging said pilot valve plate from said pilot valve plate seat and opening said pilot valve, said last named means also being adapted to urge said valve plate away from said valve plate seat after opening said pilot valve.

2. A valve according to claim 1, wherein said means to urge said cam of said pilot valve plate through said aperture in said valve plate to disengage said pilot valve plate from said pilot valve plate seat and to thereby open said pilot valve includes a rotatable shaft and means responsive to the rotation of said shaft which engage said cam and urge said cam through said aperture to open said pilot valve, and upon opposite rotation of said shaft, allows said cam to be reinserted into said aperture thereby permitting said pilot valve to close.

3. A valve according to claim 2, wherein said means responsive to the rotation of said rotatable shaft upon continued rotation of said shaft after urging said pilot valve plate cam through said aperture in said valve plate then bears against said valve plate and urges said valve away from said valve plate seat to open said valve.

4. A valve according to claim 3 including guide means which cooperate with said means responsive to said rotatable shaft to close said valve by bringing said valve plate into seating engagement with said valve plate seat upon rotation of said rotatable shaft in a direction opposite to the direction of rotation which opens said valve.

References Cited

UNITED STATES PATENTS

| | | | |
|---|---|---|---|
| 1,794,830 | 3/1931 | Benger | 137—630.15 X |
| 2,710,737 | 6/1955 | Schaupp | 251—298 X |
| 2,796,082 | 6/1957 | Green | 137—630.15 |
| 2,879,799 | 3/1959 | Jansen | 137—630.15 X |
| 3,035,595 | 5/1962 | Beason | 137—630.15 X |
| 3,136,338 | 6/1964 | Hamer | 137—630.14 |
| 3,313,318 | 4/1967 | Lyman | 137—630.15 |
| 3,075,539 | 1/1963 | Yoder | 137—240 |

CLARENCE R. GORDON, *Primary Examiner*.